(No Model.)
I. L. ROBERTS.
ELECTRIC BATTERY.
No. 386,090. Patented July 10, 1888.
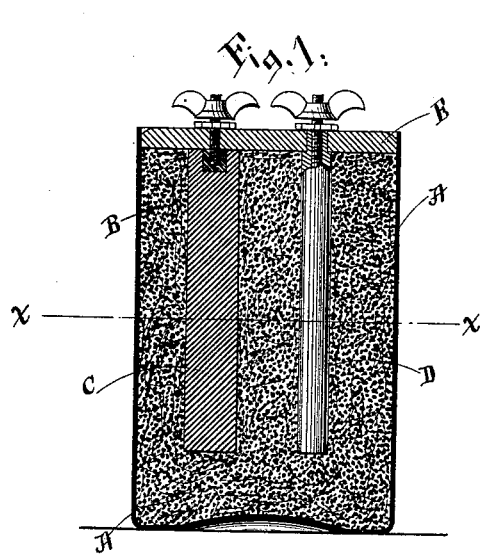
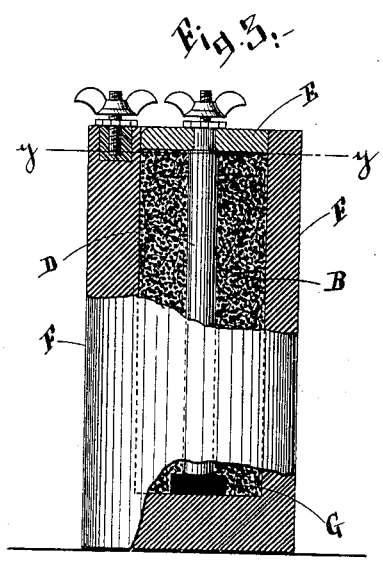
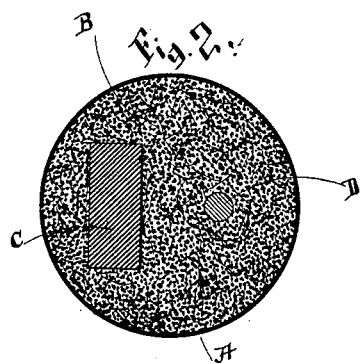
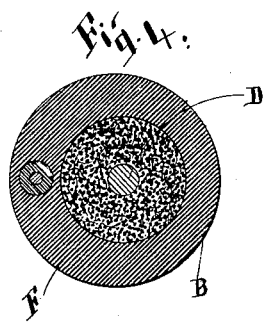
WITNESSES:
Joseph L. Levy.
Bern. T. Vetterlein.
INVENTOR
Isaiah L. Roberts,
BY
Henry L. Brevoort
his ATTORNEY.
N. PETERS, Photo-Lithographer, Washington, D. C.

UNITED STATES PATENT OFFICE.

ISAIAH L. ROBERTS, OF BROOKLYN, NEW YORK, ASSIGNOR TO THE ROBERTS-BREVOORT ELECTRIC COMPANY, (LIMITED,) OF NEW YORK.

ELECTRIC BATTERY.

SPECIFICATION forming part of Letters Patent No. 386,090, dated July 10, 1888.

Application filed June 7, 1886. Serial No. 204,315. (No model.)

*To all whom it may concern:*

Be it known that I, ISAIAH L. ROBERTS, a resident of the city of Brooklyn, county of Kings, and State of New York, and a citizen of the United States, have invented a new and Improved Electric Battery, of which the following is a specification.

My invention relates to an electric battery; and it consists, primarily, of a battery the exciting materials of which are in a condition of a paste, and which battery may be inverted and used without spilling, and may be handled in the charged condition.

Reference is had to the accompanying drawings, in which—

Figure 1 is a vertical section of my improved battery contained in a glass jar. Fig. 2 is a transverse section taken in the plane $x\ x$, Fig. 1. Fig. 3 is a side elevation, partly in section, of my alternate construction. Fig. 4 is a transverse section taken on the plane $y\ y$, Fig. 3.

Similar letters refer to similar parts throughout the several views.

In the drawings, at A, Figs. 1 and 2, is shown a glass cell, within which is contained the pasty exciting compound B. At C is shown the carbon; D, the zinc, both provided with the usual thumb-screws. At E is shown an air-tight cover, hereinafter described.

At Figs. 3 and 4 is shown my alternate construction, which consists of a cylinder of carbon, F, with a cavity, either bored or molded, within it, in which is placed the pasty exciting compound B. The manner of fastening the binding-post to the carbon cylinder forms the subject of a prior patent granted to me, and does not need to be described here. At E is shown an air-tight cover, which is identical with the cover shown in Fig. 1. G is a disk, of glass or other non-conducting material, which is inserted before the paste is put in, and on which the zinc rests, thus preventing short-circuiting.

I will now describe the pasty compound.

I take any permanganate, preferably permanganate of potash; I take bichromate of soda, and I take any salt of an alkali, preferably a chloride. I prefer to use chloride of ammonium, because it forms a pasty mass more readily with the bichromate of soda, and I prefer bichromate of soda because it is deliquescent.

I proceed to make my battery as follows: I take two pounds of permanganate of potash and four pounds of sal-ammoniac. I make a saturated solution of the bichromate of soda. I then add this to the other compound in sufficient quantity, stirring all the time, so as to make a paste which will not flow. This pasty mass is then to be placed in a battery-cell, as A or F, containing a zinc and a carbon element, as C D, around which the pasty mass is packed, as illustrated in Figs. 1 and 2, or within a carbon cylinder, as illustrated in Figs. 3 and 4.

The above-named proportions I have found to be the best, though various other proportions may be used.

The paste B never dries, but always remains moist if bichromate of soda, chloride of calcium, or some deliquescent salt of an alkali is used, but is stiff enough, if properly made, not to be displaced when the battery is inverted or shaken about. When the pasty mass is poured or packed about the elements in the cell, the battery will be ready for use. Chloride of ammonium among the alkaline salts seems to possess an advantage in hastening the attainment of the pasty condition of the mass, appearing to cause the same to set, like plaster-of-paris. If no deliquescent salt is used in the composition of the paste, it must be well sealed up with a cover, for evaporation will ultimately dry it and stop all possibility of chemical action.

The battery may ordinarily be made with a glass cell and with a carbon and a zinc element within the same, a cover being used if deliquescent materials are not employed, though a tight cover is best used in all cases. If desired, a carbon cup, F, may be made. The pasty mass B may be packed into the cup about the zinc, care being taken that the zinc does not touch the carbon. In this way the carbon cup F acts as an element of the battery and as a containing-vessel for the same. In this case I proceed as follows: The carbon cup being filled with a very pasty mass of the previously-described compound, the zinc should be inserted in it at about the center of the pasty mass to such a depth as not to touch the bottom of the carbon cup, and this pasty mass, after the zinc has been put in place, should be covered with hot asphalt, or a compound of asphalt and rosin, which when cooled will make a tight covering. The carbon cup should be treated as follows: Previous to placing the paste in it, it should be heated sufficiently hot to melt paraffine when it is touched to its surface, and then while the carbon is hot a piece of paraffine should be passed over the surface, so as to close the outer pores of the carbon completely, but not sufficiently so as to penetrate through its entire body.

What I claim, and desire to secure by Letters Patent, is—

1. The combination, in an electric battery having the exciting material in the form of a paste, of a permanganate, bichromate of soda, and the salt of an alkali, substantially as described.

2. The combination, in an electric battery having the exciting material in the form of a paste, of permanganate of potash, bichromate of soda, and the salt of an alkali, substantially as described.

3. An electric battery composed of a containing-vessel and a pasty exciting-mass consisting of bichromate of soda, a permanganate, and the salt of an alkali, in combination with the negative and positive elements and a cover of asphalt, or asphalt and rosin, substantially as herein shown and described.

4. As a new article of manufacture, an exciting-mass for an electric battery, consisting of bichromate of soda, a salt of an alkali, and a permanganate combined, substantially as described.

I. L. ROBERTS.

Witnesses:
BERN. T. VETTERLEIN,
GEORGE W. BORCHERS.